United States Patent Office 2,993,012
Patented July 18, 1961

2,993,012
ION EXCHANGE RESINS FROM VINYL-HETERO-CYCLIC COMPOUNDS, DIAMINES, AND ALDEHYDE CROSS LINKERS
Julius Friedrich Wolf, Leipzig, and Paul Manfred Morgner, Wolfen, Kreis Bitterfeld, Germany, assignors to VEB Farbenfabrik Wolfen, Wolfen, Kreis Bitterfeld, Germany
No Drawing. Filed Oct. 3, 1956, Ser. No. 613,602
Claims priority, application Germany May 23, 1956
6 Claims. (Cl. 260—2.1)

This invention relates to synthetic resins and a process for their production.

It is known to produce synthetic resins having ion exchanging properties by reacting aliphatic, aromatic or heterocyclic amines in acid solution with condensing or cross-linking agents, such as for example, formaldehyde or epichlorohydrin.

Further, it is known that amino- or imino-group comprising aliphatic or aromatic compounds alone are capable of reacting in slightly acid solution with vinyl-group comprising, hetero-nitrogen-containing compounds such as, for example 2-vinylpyridine under addition to the vinyl group.

The present invention has as its object to provide novel synthetic resins exhibiting excellent properties in general, which novel resins are particularly suitable for use as ion exchangers and for the purpose of neutral adsorption.

Another object of the invention resides in the provision of a process for the production of the novel synthetic resins referred to.

In accordance with this invention, novel synthetic resins are obtained by reacting vinyl group-comprising hetero-nitrogen-containing heterocyclic compounds with amino- or imino-group comprising compounds and condensing- or cross-linking agents, vinylpyridine and vinylquinoline are mentioned by way of example as suitable heterocyclic compounds, while polyethyleneimine and methaphenyl-enediamine or the like, are pointed out as suitable amino- or imino-group-containing compounds. The term "cross-linking agent" or "condensing agent" as used herein is deemed to mean epichlorohydrin and compounds comprising or yielding aldehyde groups.

As pointed out, the synthetic resins produced in accordance with this invention are suitable both as anion exchanger and for the purpose of neutral adsorption. They may be produced either in the course of direct synthesis from the starting materials referred to or by subjecting already produced amino- or imino-group-comprising ion exchange resins to a subsequent treatment with the vinyl group-comprising heterocyclic compounds referred to.

Hitherto, it is known to produce anion exchange resins from vinyl group-comprising, hetero-nitrogen containing-compounds, such as vinylpyridine, by admixing the latter with condensing or cross-linking agents such as p-divinylbenzene in accordance with the suspension-polymerization process. The inventive process, however, i.e.—the reaction of amino- or imino-comprising compounds, such as polyethyleneimine, with vinyl group-comprising, hetero-nitrogen containing comopunds, such as vinylpyridine, and cross-linking agents, such as epichlorohydrin, in the presence of a catalyst, which usually is an acid—renders it possible to build in the vinyl group-comprising, hetero-nitrogen containing-compounds into synthetic resins having ion exchanging properties in accordance with the principle of a condensation- and addition reaction. Considered from a process-technical point of view this mode of operation results in considerable advantages in the production of such ion exchanging synthetic resins. The reason for this resides in the fact that—as is known— condensation- and addition reactions are in general more readily controlled than are polymerization reactions. Moreover, the polymerization products obtained by suspension-polymerization are ball- or pill-shaped, while—in contrast thereto—the products prepared in accordance with condensation reactions are obtained in piece- or lump form.

The inventive, heterocyclic compounds comprising synthetic resins may be synthesized in the following manner:

According to one mode of operation, the amine or imine is dissolved in acid and reacted with vinyl group-comprising heterocyclic nitrogen compounds, such as for example vinyl-pyridine. If required or desired, the reaction may be carried out while heating and stirring. The cross-linking or condensation agent, for example epichlorohydrin, is subsequently added to the reaction mixture. If necessary, the addition of the cross-linking agent may again be effected while heating. In performing the process in this manner, a resin jelly is obtained which is dried in known manner. Subsequently it is steeped or soaked again in water in order to be used as anion exchanger or as adsorption agent with neutral adsorption characteristics.

However, if desired, the process may alternatively be carried out in such a manner that the amine or imine which is dissolved in acid is first precondensed with a quantity of cross-linking or condensing agent which quantity is insufficient to effect a complete condensation. Again this process step may be effected while stirring and heating. If one proceeds in this manner, the reaction product formed remains liquid. The intermediate liquid product thus obtained, which is thus only slightly cross-linked or condensed, is subsequently reacted with the vinyl group-comprising heterocyclic nitrogen compound. Again, heating and stirring may be used. For the purpose of the final cross-linking and resin formation this product is then finally condensed with a further quantity of cross-linking agent. In proceeding in this manner, it is possible to condense the heterocyclic compounds with so many parts by weight that the completed resin consists of up to half its weight of these amines, for example, vinylpyridine. The products are obtained in jelly form and for the purpose of further stabilization are dried in, for example, a steam-operated drying chamber or oven.

In accordance with a further alternative of the invention, the inventive synthetic resins may be produced by subjecting previously produced anion exchanging resins to treatment with a liquid, vinyl group-comprising, hetero-nitrogen containing compound under heat. These previously produced resins may for example be polyethyleneimine/epichlorohydrin resins. If necessary, this treatment may be carried out in the presence of a solvent and a catalyst. It has been ascertained that the vinyl-group-comprising hetero-nitrogen containing compound in this manner is introduced under reaction into the anion exchanging resin structure or framework.

The heterocyclic, nitrogen-containing compounds which in accordance with the inventive process are built into the ion exchanging resin may be quaternized at the nitrogen atom in known manner. For this purpose, the synthetic resin may be soaked or steeped in a solvent, such as for example methanol, whereafter the quaternizing agent, such as for example methyl iodide is admixed under vigorous stirring.

The invention will now be described by several examples, but it should be understood that these examples are given by way of illustration rather than by way of limitation and that many changes may be made in, for example, the choice of starting materials and process conditions in general without departing in any way from the spirit and scope of the invention as set forth in the appended claims.

Example 1

12 parts by weight of polyethyleneimine were dissolved in 22 parts by weight of water while adding 0.8 part by weight of glacial acetic acid and slightly heating and stirring. The glacial acetic acid was added for catalytic purposes. 1.5 parts my weight of epichlorohydrin were then added to the solution for the purpose of partial cross-linking. The solution received in this manner has a more viscous consistency. Subsequently, 18 parts by weight of 2-vinylpyridine ($n_D^{20}=1.5460$) were admixed with this viscous solution. This reaction mixture was then heated for 5 hours on a waterbath under reflux.

For the purpose of the final cross-linking and resin formation, a further amount of 6 parts by weight of epichlorohydrin were thereafter added to the reaction mixture. After about 10 minutes a resin jelly was formed which was dried in known manner for a prolonged period of time in a drying oven. The dry product obtained has a red-brown color and exhibited excellent ion exchanging properties and was particularly suitable for use as neutral adsorption agent.

For the purpose of quaternization, the resin obtained was presteeped in methanol for about 12 hours whereafter it was treated with methyliodide for 12 hours while stirring.

Example 2

12 parts by weight of polyethyleneimine, 0.4 part by weight of glacial acetic acid and 20 parts by weight of 2-vinylpyridine ($n_D^{20}=15438$) were dissolved in 22 parts by weight of water. The reaction mixture thus obtained was heated under reflux for 6 hours. 8 parts by weight of epichlorohydrin were thereafter added to the reaction mixture while stirring. After 15 minutes a resin jelly was formed which was dried for 24 hours in a steam-operating drying chamber. If desired, the resin thus obtained may be quaternized in the manner described in connection with Example 1.

Example 3

10 parts by weight of a moist anion exchanging resin, which had been produced by the condensation of polyethyleneimine with epichlorohydrin, were treated for 4 hours with 2 parts by weight of glacial acetic acid and 10.5 parts by weight of 2-vinylpyridine ($n_D^{20}=1.5460$). The reaction was carried out under heating and under reflux. Excess vinylpyridine was thereafter removed by suction and the resin obtained was washed with water. If desired, the synthetic resin product obtained may be quaternized as described in Example 1.

Example 4

12 parts by weight of polyethylenediamine were dissolved in 22 parts by weight of water and 0.8 part by weight of glacial acetic acid. The solution thus obtained was cooled and 1.5 parts by weight of epichlorohydrin were added thereto. The reaction mixture developed heat and was admixed with 4 parts by weight of 4-vinylpyridine of 78% strength and 6 parts by weight of epichlorohydrin. The last mentioned additions caused a vigorous reaction which latter was completed in a drying oven (8 hours at 120° C.). The resin thus obtained was washed, dried and quaternized with methyliodide as described in Example 1.

Example 5

6 parts by weight of polyethyleneimine and 6 parts by weight of m-phenylenediamine were dissolved in 22 parts by weight of water and 0.8 part by weight of glacial acetic acid. 1.5 parts by weight of epichlorohydrin were added to the solution thus obtained, whereafter the solution was heated for a short time. 4 parts by weight of 4-vinylpyridine of 78% concentration were thereafter added to the solution. The reaction product condensed, while stirring with mechanical means, to yield a viscous liquid which latter solidified in a drying oven at a temperature of 110° C. to yield a solid resin. The working up of this resin may be performed as described in Example 1.

Example 6

12 parts by weight of polyethyleneimine were dissolved in 22 parts by weight of water with the addition of 0.8 part by weight of glacial acetic acid as catalyst. This reaction step was carried out while slightly heating and stirring. After the dissolution was effected, 1.6 parts by weight of epichlorohydrin were added to the reaction mixture for the purpose of precondensation. The addition of the epichlorohydrin caused the solution to become more viscous. Thereafter 4 parts by weight of 2-vinylquinoline and 6 parts by weight of epichlorohydrin were added. After about 15-20 minutes, the reaction mixture formed a resin gel. This resin gel was dried in known manner in a drying oven for a prolonged period of time at about 120° C. The product thus obtained exhibited a red-brown color. For the purpose of quaternization, the resin is pre-steeped in methanol for about 12 hours and thereafter treated, while stirring, for 12 hours with methyl iodide.

Example 7

12 parts by weight of polyethylenediamine were dissolved in 22 parts by weight of water and 0.8 part by weight of glacial acetic acid. The solution thus obtained was cooled and thereafter admixed with 1.5 parts by weight of epichlorohydrin while stirring. Thereafter, 4 parts by weight of 2-vinylquinoline and 6 parts by weight of a further amount of epichlorohydrin were added. A vigorous reaction occurred. After a prolonged period of stirring, a gel-kind resin was obtained, which resin was further condensed for several hours in a drying oven at a temperature of 120° C. If desired, this resin may be quaternized, as described in Example 1.

Example 8

6 parts by weight of polyethyleneimine and 6 parts by weight of m-phenylenediamine were dissolved in 22 parts by weight of water and 0.8 part by weight of glacial acetic acid. The mixture thus obtained was heated for a short time. This mixture was admixed with 4 parts by weight of 2-vinylquinoline and 7.5 parts by weight of epichlorohydrin. A resin gel was formed after about 20 minutes. This resin gel was dried in a drying oven for 24 hours at 120° C. The resin, if desired, may be quaternized as described in Example 1.

Example 9

4.8 parts by weight of dicyanodiamide were dissolved while stirring in 17.5 parts by weight of formaline (30% concentration) in the course of one hour and at a temperature of about 80° to 90° C. The solution thus obtained was thereafter cooled to 20° C., whereafter a mixture comprising 6 parts by weight of m-phenylenediamine, 8.5 parts by weight of glacial acetic acid and 4 parts by weight of 4-vinylpyridine were added. A further amount of 17 parts by weight of formaline (30% concentration) was used as condensing agent. The condensation mixture solidified to yield a resin-like product. The further working up of this product may be effected as described in Example 1.

Example 10

4.8 parts by weight of dicyanodiamide were dissolved in 17.5 parts by weight of formaline of 30% concentration, while stirring. The solution thus obtained was cooled to 20° C. and thereafter admixed with a solution comprising 6 parts by weight of m-phenylenediamine in 8.5 parts by weight of glacial acetic acid and 4 parts by weight of 4-vinylpyridine. As cross-linking agent, 1.7 parts by weight of epichlorohydrin were employed. After about 20 minutes, a resin gel was formed which was dried in a steam drying oven. The quaternization of the resin may, if desired, be effected as described in Example 1.

*Example 11*

3 parts by weight of m-phenylenediamine were dissolved in 10 parts by weight of water, 6.8 parts by weight of ice and 2.7 parts by weight of glacial acetic acid, while stirring and slightly heating. After cooling the mixture thus obtained to 20° C., a solution comprising 1.2 parts by weight of polyethylenediamine in 6 parts by weight of water, 2 parts by weight of glacial acetic acid as well as 2.2 parts by weight of 4-vinylpyridine was added thereto. The condensation was carried out by introducing into the mixture 1.4 parts by weight of epichlorohydrin, while stirring. The condensation mixture developed some heat, and after about 20 minutes, a resin-like product was formed. This resin was dried at about 100° to 110° C., washed and worked up in accordance with Example 1.

*Example 12*

3 parts by weight of m-phenylenediamine were dissolved in 10 parts by weight of water, 6.8 parts by weight of ice, and 2.7 parts by weight of glacial acetic acid, while stirring, and slightly heating. After cooling the solution to about 20° C., a mixture of 1.2 parts by weight of polyethylenediamine in 6 parts by weight of water, 2 parts by weight of glacial acetic acid as well as 2.2 parts by weight of 4-vinylpyridine (78% concentration) was added thereto. As cross-linking agent, 4.3 parts by weight of formaline (30% concentration) were admixed while stirring. The reaction product developed heat, and formed, after about 20 to 30 minutes, a resin-like product. The working up of the resin was carried out as described in Example 1.

*Example 13*

13 parts by weight of m-phenylenediamine were dissolved in 30 parts by weight of water and 0.4 part by weight of glacial acetic acid. After cooling the solution thus obtained to 20° C., 6 parts by weight of 4-vinylpyridine (78% concentration) were added thereto while stirring. As condensing agent, 16 parts by weight of formaline (30% concentration) were used. After about 15 minutes, a resin gel was formed, which was further condensed in known manner in a drying oven at a temperature of 100° C. for a prolonged period of time. The solid resin thus obtained exhibited a black color. The quaternization may be effected as described in connection with Example 1.

*Example 14*

12 parts by weight of polyethyleneimine were dissolved in 22 parts by weight of water and 0.8 part by weight of glacial acetic acid. The reaction mixture developed some heat and was admixed with 3.9 parts by weight of 2-vinylpyridine of 81% strength. 6 parts by weight of acetaldehyde were added as cross-linking agent while stirring. The condensation mixture got hot to a considerable extent and solidified to a solid red-brown resin, which latter was further worked up in the usual manner, as described in Example 1.

*Example 15*

12 parts by weight of polyethyleneimine were dissolved in 22 parts by weight of water and 0.8 part by weight of glacial acetic acid. The heat developed during the addition of the imine was sufficient to effect the dissolution. The solution thus obtained was admixed with 3.9 parts by weight of 2-vinylpyridine (81% concentration), while stirring. As cross-linking agent 2.7 parts by weight of paraformaldehyde were used. After about 2 hours, the reaction mixture solidified to yield a solid resin mass, which was further worked up as described in Example 1.

*Example 16*

12 parts by weight of polyethyleneimine were dissolved in 22 parts by weight of water and 0.8 part by weight of acetic acid. The solution thus obtained was cooled to room temperature, whereafter it was admixed with 3.9 parts by weight of 2-vinylpyridine (81% concentration). 8 parts by weight of paraldehyde were required for the condensation. The condensation mixture solidified to form a rubber-like resin only after having been subjected to heating for 24 hours in a steam drying oven at a temperature of 85° C. The further working up of the resin may be effected as described in Example 1.

As is apparent from the preceding examples, the reactants may be employed in the present process in amounts falling within the following ranges:

|  | Parts by weight |
|---|---|
| (1) Amino or imino compound including mixtures thereof | 4.2 to 13 |
| (2) Vinyl substituted heterocyclic nitrogen compounds | 2.2 to 20 |
| (3) Cross linking agent | 1.5 to 19.2 |

What we claim is:

1. A process for the preparation of synthetic resins, which comprises reacting until resinification occurs, in an acid medium, the nitrogen-containing compound dicyandiamide with a vinyl substituted heterocyclic nitrogen compound selected from the class consisting of 4-vinylpyridine, 2-vinylpyridine and 2-vinylquinoline, and a cross-linking agent selected from the class consisting of epichlorohydrin, formalin, paraformaldehyde, acetaldehyde and paraldehyde, wherein said nitrogen-containing compound is employed in the range of about 4.2 to 13 parts by weight, said vinyl substituted heterocyclic nitrogen compound is employed in the range of about 2.2 to 20 parts by weight, and said cross-linking agent is employed in the range of about 1.5 to 19.2 parts by weight.

2. A process for the preparation of synthetic resins, which comprises reacting until resinification occurs, in an acid medium, the nitrogen-containing compound m-phenylene diamine with a vinyl substituted heterocyclic nitrogen compound selected from the class consisting of 4-vinylpyridine, 2-vinylpyridine and 2-vinylquinoline, and a cross-linking agent selected from the class consisting of epichlorohydrin, formaline, paraformaldehyde, acetaldehyde and paraldehyde, wherein said nitrogen-containing compound is employed in the range of about 4.2 to 13 parts by weight, said vinyl substituted heterocyclic nitrogen compound is employed in the range of about 2.2 to 20 parts by weight, and said cross-linking agent is employed in the range of about 1.5 to 19.2 parts by weight.

3. A process for the preparation of synthetic resins, which comprises reacting, until resinification occurs, in an acid medium, a mixture of the nitrogen-containing compounds dicyandiamide and m-phenylene diamine with a vinyl substituted heterocyclic nitrogen compound selected from the class consisting of 4-vinylpyridine, 2-vinylpyridine and 2-vinylquinoline, and a cross-linking agent selected from the class consisting of epichlorohydrin, formalin, paraformaldehyde, acetaldehyde and paraldehyde, wherein said mixture of nitrogen-containing compounds is employed in the range of about 4.2 to 13 parts by weight, said vinyl substituted heterocyclic nitrogen compound is employed in the range of about 2.2 to 20 parts by weight, and said cross-linking agent is employed in the range of about 1.5 to 19.2 parts by weight.

4. Products made by the process of claim 1.
5. Products made by the process of claim 2.
6. Products made by the process of claim 3.

No references cited.